(12) United States Patent
Combs

(10) Patent No.: US 12,104,820 B2
(45) Date of Patent: Oct. 1, 2024

(54) PLUG WITH ROTATING FLAP FOR PROCESS FOR USE IN A FORMING AN INSULATED REGISTER BOX

(71) Applicant: STERLING CUSTOM SHEET METAL, INC., Magnolia, TX (US)

(72) Inventor: Sterling Kidd Combs, Magnolia, TX (US)

( * ) Notice: Subject to any disclaimer, the term of this patent is extended or adjusted under 35 U.S.C. 154(b) by 883 days.

(21) Appl. No.: 17/175,956

(22) Filed: Feb. 15, 2021

(65) Prior Publication Data
US 2021/0231342 A1 Jul. 29, 2021

Related U.S. Application Data

(60) Continuation-in-part of application No. 17/175,922, filed on Feb. 15, 2021, now Pat. No. 12,000,613, which is a continuation-in-part of application No. 17/171,638, filed on Feb. 9, 2021, which is a continuation-in-part of application No. 16/036,059, filed on Jul. 16, 2018, now Pat. No. 11,060,756, which is a continuation-in-part of application No. 16/005,235, filed on Jun. 11, 2018, now Pat. No. 11,402,121, and a continuation-in-part of application No. 15/864,612, filed on Jan. 8, 2018, now Pat. No.
(Continued)

(51) Int. Cl.
| | | |
|---|---|---|
| F24F 13/08 | (2006.01) |
| B29C 41/20 | (2006.01) |
| B29C 44/18 | (2006.01) |
| B29C 44/36 | (2006.01) |
| B29K 75/00 | (2006.01) |
| B29K 105/00 | (2006.01) |
| F24F 13/06 | (2006.01) |

(52) U.S. Cl.
CPC ............ *F24F 13/082* (2013.01); *B29C 41/20* (2013.01); *B29C 44/18* (2013.01); *F24F 13/06* (2013.01); *B29C 44/36* (2013.01); *B29K 2075/00* (2013.01); *B29K 2105/0058* (2013.01); *B29K 2995/0015* (2013.01); *Y10T 29/49158* (2015.01); *Y10T 428/233* (2015.01)

(58) Field of Classification Search
CPC ..................................................... B29C 41/20
See application file for complete search history.

(56) References Cited

U.S. PATENT DOCUMENTS 2,356,827 A * 8/1944 Coss ...................... F25D 23/064
52/749.1
3,985,158 A 10/1976 Felter
(Continued)

*Primary Examiner* — Nahida Sultana
*Assistant Examiner* — Virak Nguon
(74) *Attorney, Agent, or Firm* — Egbert, McDaniel & Swartz, PLLC

(57) ABSTRACT

A plug assembly for use in a process for manufacturing an insulated register box has a body having a bottom and at least one side wall extending upwardly from the bottom, a rotatable element at the bottom of the body, and an actuator connected to the rotatable element and positioned above the rotatable element. The rotatable element is adapted to seal an end of a duct in an interior of the box of the insulated register box. The rotatable element is movable between an installation position and a sealing position. The actuator is cooperative with the rotatable element so as to move the rotatable element between the installation position and the sealing position.

19 Claims, 11 Drawing Sheets

Related U.S. Application Data

10,995,969, said application No. 16/005,235 is a continuation-in-part of application No. 15/703,436, filed on Sep. 13, 2017, now Pat. No. 10,648,695, which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969, said application No. 15/864,612 is a division of application No. 14/668,079, filed on Mar. 25, 2015, now Pat. No. 9,951,969.

(56) References Cited

U.S. PATENT DOCUMENTS

| | | |
|---|---|---|
| 4,735,235 A | 4/1988 | Anderson |
| 5,095,942 A | 3/1992 | Murphy |
| 5,219,403 A | 6/1993 | Murphy |
| 5,658,196 A | 8/1997 | Swaim |
| 5,749,190 A | 5/1998 | Williams |
| 5,957,506 A | 9/1999 | Stepp |
| 2004/0130154 A1 | 7/2004 | Stepp |
| 2008/0014860 A1 | 1/2008 | Heitman |
| 2008/0045137 A1 | 2/2008 | Rosal |
| 2021/0239274 A1* | 8/2021 | Ramirez Dala ......... F16L 59/14 |

* cited by examiner

PLUG WITH ROTATING FLAP FOR PROCESS FOR USE IN A FORMING AN INSULATED REGISTER BOX

CROSS-REFERENCE TO RELATED APPLICATIONS

The present application is a continuation-in-part of U.S. patent application Ser. No. 17/175,922, filed on Feb. 15, 2021, and entitled "Plug for Use in a Process of Forming an Insulated Register Box", now U.S. Pat. No. 12,000,613. U.S. patent application Ser. No. 17/175,922 is a continuation-in-part of U.S. patent application Ser. No. 17/171,638, filed on Feb. 9, 2021, and entitled "Conveyor Process for Forming an Insulated Register Box", now U.S. Pat. No. 11,060,756. U.S. patent application Ser. No. 17/171,638 is a continuation-in-part of U.S. patent application Ser. No. 16/036,059, filed on Jul. 16, 2018 and entitled "Insulated Register Box and Process For Forming Such Insulated Register Box", presently pending. U.S. patent application Ser. No. 16/036,059 was a continuation-in-part of U.S. patent application Ser. No. 15/864,612, filed in Jan. 8, 2018, which is a divisional of U.S. patent application Ser. No. 14/668,079, filed Mar. 25, 2015 and entitled "Insulated Register Box", now U.S. Pat. No. 9,951,969. U.S. patent application Ser. No. 16/036,059 was also a continuation-in-part of U.S. patent application Ser. No. 16/005,235, filed on Jun. 11, 2018 and entitled "Insulated Register Box with the Boot Rail Adapter", now U.S. Pat. No. 11,402,121. U.S. patent application Ser. No. 16/005,235 is a continuation-in-part of U.S. patent application Ser. No. 15/703,436, filed on Sep. 13, 2017, which issued as U.S. Pat. No. 10,648,695 on May 12, 2020 and entitled "Insulated Register Box with Boot Rail Adapter". U.S. patent application Ser. No. 15/703,436 is a continuation-in-part of U.S. patent application Ser. No. 15/439,454, filed Feb. 22, 2017 and entitled "Process for Forming an Insulated Register Box", which issued as U.S. Pat. No. 10,309,682 on Jun. 4, 2019 and entitled "Process For Forming an Insulated Register Box". U.S. patent application Ser. No. 15/439,454 was a continuation-in-part of U.S. patent application Ser. No. 14/668,079, filed on Mar. 25, 2015 and entitled "Insulated Register Box and Method for Forming an Insulated Register Box", which issued as U.S. Pat. No. 9,951,969 on Apr. 24, 2018.

BACKGROUND OF THE INVENTION

1. Field of the Invention

The present invention relates to ductwork for heating, ventilation and air-conditioning (HVAC) systems. More particularly, the present invention relates to processes for forming register boxes as used in such systems. More particularly, the present invention relates to conveyor-style processes for forming such register boxes. In particular, the present invention relates to plugs as used in the conveyor-style process for forming such register boxes.

2. Description of Related Art Including Information Disclosed Under 37 CFR 1.97 and 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

The present Applicant is the owner of several patents and patent application publications related to such register boxes and the processes for forming such register boxes. For example, U.S. Patent Application No. 2018/0363942, published on Dec. 20, 2018 to the present Applicant, describes an insulated register box and process for forming the insulated register box. This register box has a body with a plurality of side walls arranged in a generally rectangular or square configuration and a plurality of flanges extending inwardly from the plurality of side walls. An expandable polymeric material is affixed to an inner side of each of the plurality of side wall such that the expandable polymeric material has a portion extending across one end of the body inwardly of the plurality of flanges. A sheet is positioned over the portion of the expandable polymeric material at one end of the body such that the sheet is interposed between the plurality of flanges and the portion of the expandable polymeric material. The expandable polymeric material and the sheet are cuttable so as to open to the interior of the register box.

U.S. Pat. No. 10,648,695, issued on May 12, 2020 to the present Applicant, describes a register box with a boot rail adapter that has an insulating material affixed within the register box, a guide rail affixed to a side panel of the register box, and a rail having a section received in a slot of the rail guide. The rail is adapted to be affixed to a supporting surface, such as a joist. The rail guide is slidable relative to the rail. The rail guide is affixed to an exterior surface of the side panel.

U.S. Pat. No. 10,309,682, issued on Jun. 4, 2019 to the present Applicant, teaches a process for insulating a register box in which the register box has a plurality of side panels arranged in a generally rectangular configuration and a duct opening through a wall that extends across the generally rectangular configuration. This process involves flowing an expandable polymeric material toward the plurality of side panels, placing the register box into or onto a support structure, introducing a liner over the flowed expandable polymeric material within the register box, and placing a form onto the liner in the register box so as to shape the expandable polymeric material within the register box. The form and the liner then removed from the register box.

U.S. Patent Application Publication No. 2018/0320921, published on Nov. 8, 2018 to the present Applicant, teaches an insulated register box apparatus with a boot rail adapter which has an insulating material affixed within the register box, a rail affixed to a side panel of the register box, and a rail guide having a slot that receives a section of the rail therein. The rail guide is adapted to be affixed to a supporting surface. The rail is affixed at least one of the side panels of the register box. The rail is slidable relative to the rail guide. The register box has a plurality of side panels and a duct that opens to an interior of the plurality of side panels. The insulating material extends inwardly of the plurality of side panels.

U.S. Patent Application Publication No. 2018/0187919, published on Jul. 5, 2018 to the present Applicant, teaches an insulated register box for HVAC installations that has a body with a plurality of side panels arranged in a generally rectangular or square configuration and a wall extending across the rectangular configuration. A duct opens through the wall so as to communicate with an interior of the body. An expandable foamed polymeric material is affixed to an inner side of the side panels. The wall has a surface extending from the opening of the duct to the side panels. The expandable foamed polymeric material is affixed to the surface of the wall.

U.S. Pat. No. 9,951,969, issued on Apr. 24, 2018 to the present Applicant, describes an insulated register box and a method for forming such an insulated register box. The register box has a body with a plurality of side panels arranged in a generally rectangular or square configuration and a wall extending across the rectangular configuration. A duct opens through the wall so as to communicate with the interior of the body. An expandable foamed polymeric material is affixed to an inner side of the side panels. The wall has a surface extending from the opening of the duct to the side panels. The expandable foamed polymeric material is affixed to the surface of the wall.

With these prior patents and patent application publications, the process for forming the register box involved the use of a carousel-type of operation. In essence, the worker would place the assembly into a "Lazy Susan" type of carousel and rotate the carousel as the expandable polymeric material would dry or cure during the rotation of the carousel. This operation was excellent in practice, but the Applicant in these prior patents and patent application publications found that it was not well suited to high production volumes. It was also very labor-intensive. This operation involved a lot of manual manipulation that could result in potential injury to workers. Ultimately, a great deal of lifting was required in order to place plates, plugs and supports within each of the openings of the carousel. As a result, production was slow. The production of such register boxes was very much limited due to the efficiency of the particular worker at the carousel. These carousels also occupied a relatively large footprint within the factory. It was not adapted to efficiently allow for multiple carousels to be employed within the factory environment. If multiple carousels were employed, the workers associated with such carousels were significantly spaced from one another. As such, the use of a common foam gun or other appliances was somewhat limited. As such, a need developed so as to enhance the ability to produce large volumes of such insulated register boxes while reducing labor efforts required for such production.

U.S. patent application Ser. No. 17/171,638 to the present Applicant describes a conveyor process for forming an insulated register box. In particular, in this application, a plug was utilized so as to allow for the forming of the insulation on the interior of the register box. This plug is in the nature of a generally rectangular or square plug that would fit into the register box. The expanded polymeric material would expand and form around the exterior of the plug. In order to keep the expanded polymeric material from entering the interior of the duct, the end of the plug would bear against the circumference of the duct so as to prevent the entry of the expandable polymeric foam material into the interior of the duct. Unfortunately, certain register boxes are formed wherein the end of the register box opposite to the duct has a smaller length or width than the diameter of the duct. As such, the plug (which fits through the opening at the end of the box) would lack the necessary size and would, as a result, leave certain openings exposed around the circumference of the duct. If the plug were of a greater size, then it could not fit through the opening of the box. As such, a need developed so as to assure that the sealing effects of the plug would occur on those ducts having a greater diameter than the width or length of the opening of the box.

It is an object of the present invention to provide a plug for a process for forming an insulated register box which allows the register boxes to be produced at a relatively high rate.

It is another object of the present invention to provide a plug for a process for forming an insulated register boxes which allows multiple systems to be employed inside-by-side relationship.

It is another object of the present invention to provide a plug for forming an insulated register box that reduces the amount of labor required for the production of such insulated register boxes.

It is another object of the present invention to provide a plug for a process for forming an insulated register box which reduces the amount of effort by the worker in the production of such an insulated register box.

It is a further object of the present invention to provide a plug for a process for forming an insulated register box which allows workers to work inside-by-side relationship within a very small footprint.

It is a further object of the present invention to provide a plug for a process for forming an insulated register box which reduces the cost required in the production of such register boxes and reduces the amount of labor required for such production.

It is a further object of the present invention to provide a plug for a process for forming an insulated register box which prevents the expandable foam material from entering the duct of such insulated register box.

It is another object of the present invention to provide a plug for a process for forming an insulated register box which reduces the amount of expandable polymeric foam material used in the production of such register boxes.

It is another object the present invention to provide a plug for a process for forming an insulated register box which reduces or eliminates any cleaning efforts required for the cleaning of the interior of the duct.

It is another object of the present invention to provide a plug for a process for forming an insulated register box which increases the accuracy of the amount of expandable polymeric foam material dispensed into the interior of the register box.

It is still another object of the present invention to provide a plug for a process for forming an insulated register box which allows the register box to be produced in a conveyor-style fashion.

It is still a further object of the present invention to provide a plug for a process for forming an insulated register box which improves the appearance of the register box.

It is an object of the present invention to provide a plug for a process for forming an insulated register box which allows the plug to effectively cover end surfaces of the duct that have dimensions greater than the opening of the box.

It is still another object of the present invention to provide a plug for a process for forming an insulated register box which allows for the sealing of the duct during the conveyor process.

These and other objects and advantages of the present invention will become apparent from a reading of the attached specification and appended claims.

BRIEF SUMMARY OF THE INVENTION

The present invention is a plug assembly for use in a process for manufacturing an insulated register box in which the insulated register box has a box with a duct affixed thereto and extending thereinto. The plug assembly comprises a body having a bottom and at least one side wall extending upwardly from the bottom, a rotatable element at the bottom of the body, and an actuator connected to the rotatable element and positioned above the rotatable element. The rotatable element is adapted to seal an end of the duct on an interior of the box. The rotatable element is movable between an installation position and a sealing position. The actuator is cooperative with the rotatable element so as to move the rotatable element between the installation position and the sealing position.

In the present invention, the rotatable element is formed of a polymeric or elastomeric material. Alternatively, the rotatable element can have a polymeric or elastomeric material thereon. The rotatable element has sides extending in parallel relation and curved ends at opposite ends of the sides. The curved ends can be in the nature of flaps (having relative narrow thickness) Algorithm gasket seal is affixed to the bottom of the body. The rotatable element is positioned generally centrally of the gasket seal. The rotatable element has a bottom surface adapted to abut an end of the duct. The bottom surface of the rotatable element is generally coplanar with the bottom of the gasket seal. The sealing position of the rotatable element is transverse to the installation position of the rotatable element. The flaps of the rotatable element would overlie the end of the duct when the rotatable element is in the sealing position.

The actuator is connected to the rotatable element by a shaft. In one embodiment of the present invention, the actuator is a handle positioned at a top of the body. The shaft extends downwardly from the handle so as to connect to the rotatable element. The rotatable element has a block affixed thereto. The shaft is affixed to the block. Alternatively, the actuator can be an activation plate positioned at a top of the body. The activation plate is adapted to rotate the rotatable element by 90° upon receiving a compressive force thereon. The activation plate returns the rotatable element 90° or moves the rotatable element another 90° upon release of the compressive force thereon.

The body has a plurality of ledges extending outwardly of the upper end of the plurality of side walls. The plurality of ledges are adapted to abut an end of the box opposite the duct. The plurality of side walls of the body are tapered so as to narrow toward the bottom of the body.

The present invention is also an assembly for use in a process for manufacturing an insulated register box. This assembly comprises a register box having a box and a duct affixed thereto, a support having an opening at an upper surface thereof, an expandable polymeric material received in the interior of the box, a plug assembly, and a plastic sheet interposed between the plug assembly and the expandable polymeric material. The duct has end extending into an interior of the box. The box has an opening at the end opposite the duct. This opening of the box has a width less than a diameter of the duct. The duct of the register box is received in the opening of the support. The plug assembly comprises a body having a bottom and at least one side wall extending upwardly from the bottom, a rotatable element at the bottom of the body, and an actuator connected to the rotatable element and positioned above the rotatable element. The rotatable element is adapted to seal an end of the duct in an interior of the box. The rotatable element is movable between an installation position and a sealing position. The actuator is cooperative with rotatable element so as to move the rotatable element between the installation position and the sealing position.

The rotatable element is formed of a polymeric or elastomeric material or has a polymeric or elastomeric material thereon. The rotatable element has sides extending in parallel relation to each other and curved ends at opposite ends of the sides. The curved ends will act as flaps covering the end of the duct when the rotatable element is in the installation position. A gasket seal is affixed to the bottom of the body. The rotatable element is positioned centrally of the gasket seal. The rotatable element has a bottom surface adapted to abut the end of the duct. The bottom surface of the rotatable element is generally coplanar with the bottom of the gasket seal. The sealing position of the rotatable element is transverse to the installation position of the rotatable element.

In one embodiment, the actuator is connected to the rotatable element by shaft. The shaft is a handle that is positioned at a top of the body. The shaft extends downwardly from the handle so as to connect with the rotatable element. Specifically, the rotatable element has a block affixed thereto. The shaft is affixed to the block. Alternatively, the actuator is in activation plate positioned at the top of the body. The activation plate is adapted to rotate the rotatable element by 90° upon receiving a compressive force thereon. The activation plate returns the rotatable element 90° or moves the rotatable element another 90° upon release of the compressive force.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
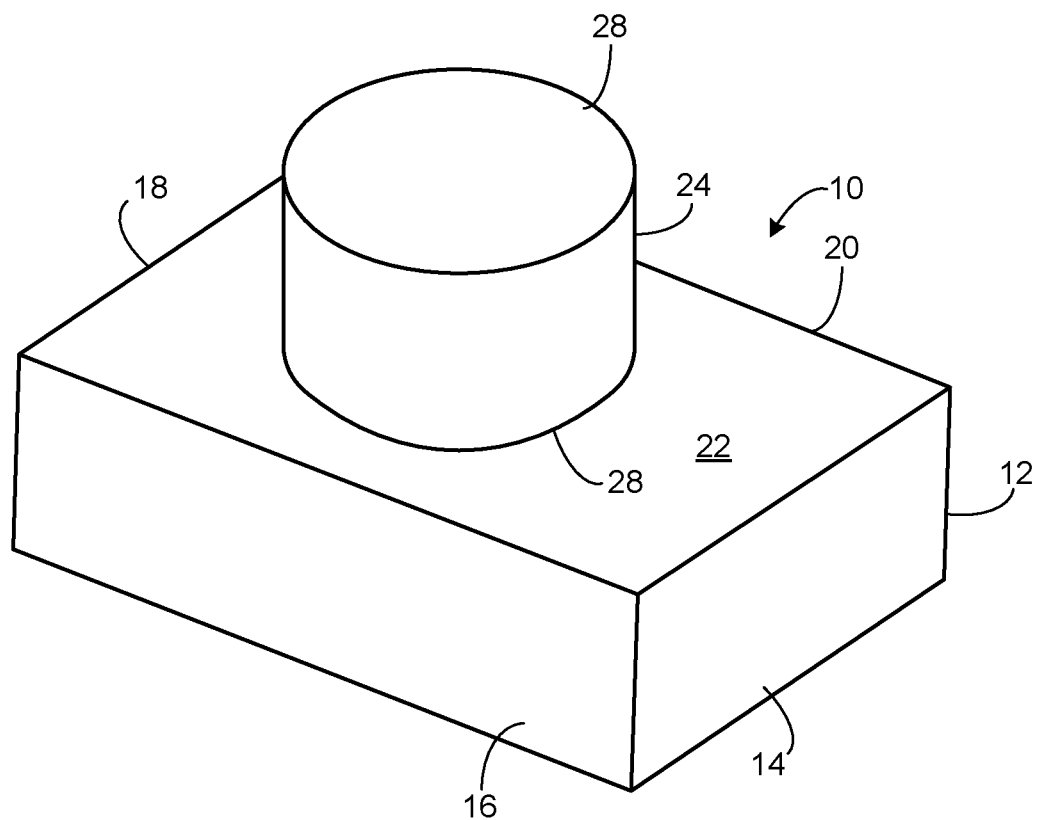
FIG. 1 is a perspective view of the insulated register box that is produced by the process of the present invention.

Referring to FIG. 1, there shown the insulated register box 10 as formed in accordance with the process of the present invention. The register box 10 includes a box 12 having side walls 14, 16, 18 and 20 formed into a generally rectangular configuration. A back wall 22 extends across this generally rectangular configuration. A duct 24 is illustrated as affixed to the back wall 22 so as to open to the interior of the box 12. The duct 24 includes an open end 26 so as to allow duct 24 to be connected to the HVAC system of a building. Conventionally, the register box 10 will be formed and pieced together through the use of tack welding. In particular, the duct 24 can be tack welded to the box 22. As such, the duct 24 will have a portion that extends into the interior of the box 12 defined by the side walls 14, 16, 18 and 20.

Figure 2:
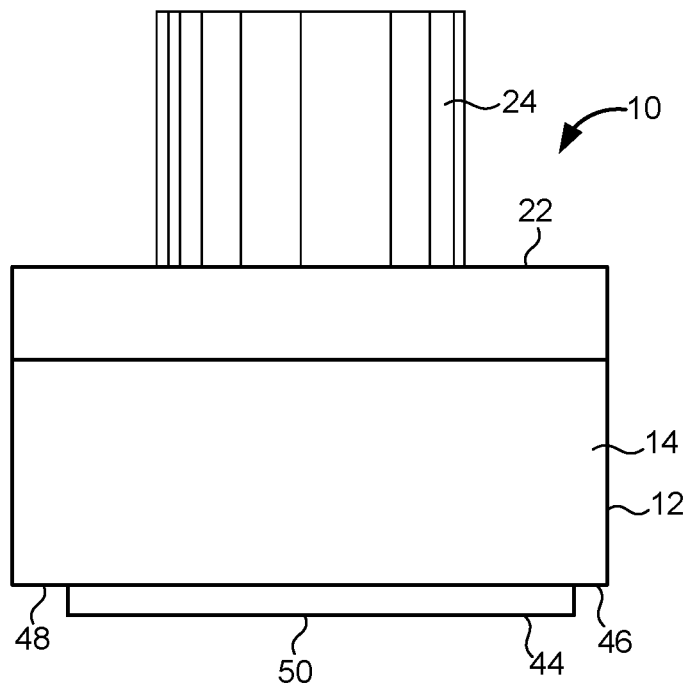
FIG. 2 is a side elevational view of the insulated register box produced by the process of the present invention.

FIG. 2 shows a side view of the register box 10. As can be seen in FIG. 2, the side wall 14 is particularly illustrated. The duct 24 is illustrated as affixed to and extending outwardly of the back wall 22. It can be seen that there is a lip 44 that extends outwardly of the end 46 of the box 12. The lip 44, as will be described hereinafter, extends outwardly of a flange 48. Flange 48 extends inwardly from the side walls 14, 16, 18 and 20 such that the inner edge, as defined by aperture 50, opens to the interior of the box 12.

Figure 3:
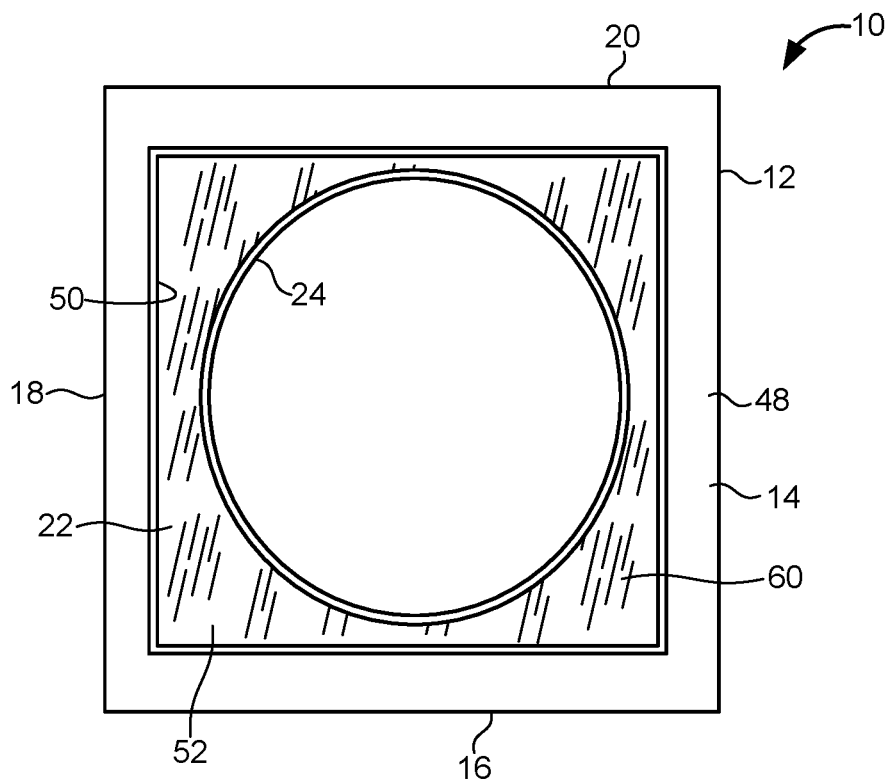
FIG. 3 is a plan view of the insulated register box produced as a result of the process of the present invention.

FIG. 3 is an end view of the register box of the present invention. In FIG. 3, it can be seen that the duct 24 is affixed to the back wall 22. Back wall 22 includes a surface 52 that extends from the opening of the duct 24 to the side walls 14, 16, 18 and 20 of the box 12. The expandable polymeric material 60 resides over the surface 52 and extends to the side walls 14, 16, 18 and 20. As such, the expandable polymeric material 60 effectively insulates the back wall 22 in the area adjacent to the opening of the duct 24.

FIG. 3 further shows the nature of the flanges 48. Flanges 48 have a particular width. In accordance with the present invention, the expandable polymeric material 60 will reside against the side walls 14, 16, 18 and 20 and have a thickness approximately equal to the width of the flanges 48. The lip 50 is illustrated as extending in transverse relationship from the flange 48.

Figure 4:
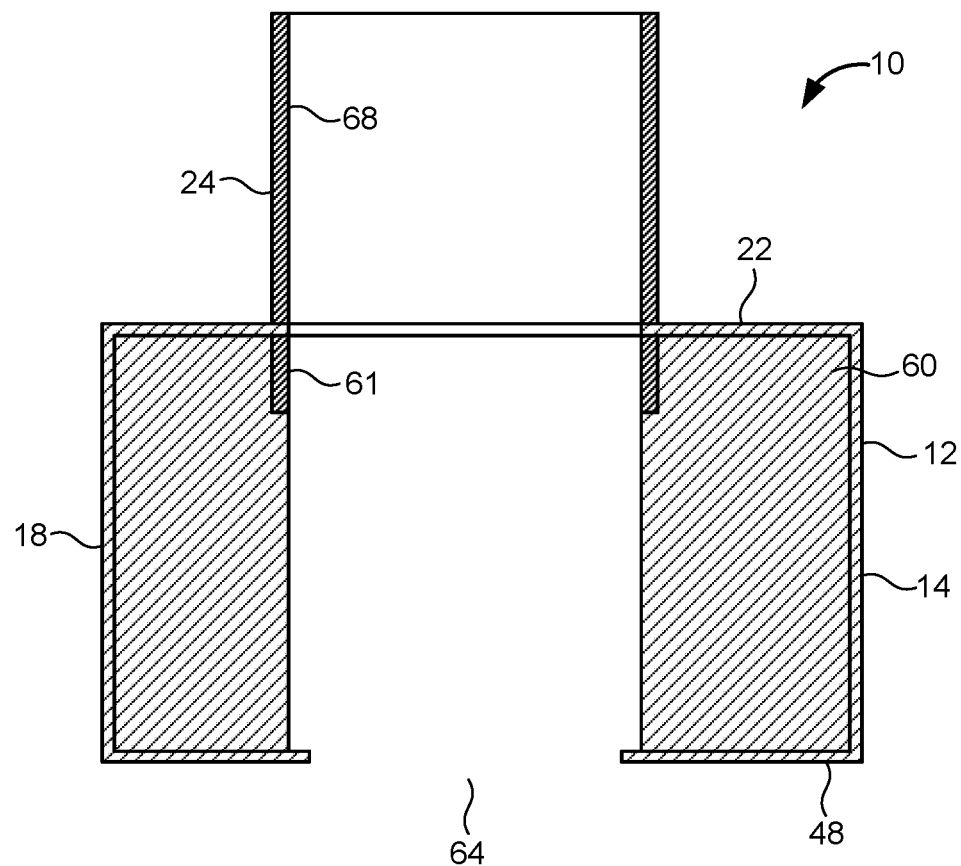
FIG. 4 is a cross-sectional view of the insulated register box is produced by the process of the present invention.

FIG. 4 is a cross-sectional view of the register box 10 of the present invention. As can be seen in FIG. 4, the expandable polymeric material 60 is illustrated as positioned against the side walls 14 and 18. A similar configuration will occur with respect to the side walls 16 and 20. The flange 48 defines aperture 50 that opens to the interior of the box 12. In this configuration of the insulated register box, the aperture 50 of the insulated register box 10 of the present invention has a width that is less than the diameter of duct 24. As will be described hereinafter, when a plug is introduced so as to form the expanded polymeric material 60, the plug (having a smaller width than the aperture 50) will lack the ability to cover the entire circumference of the duct 24 and, as such, would not be able to prevent the expandable polymeric material from entering the interior of duct 24. If the plug were large enough to cover the entire circumference of duct 24, it could not fit through opening 50. The expandable polymeric material 60 also has a portion that resides against the inner surface of the back wall 22. This portion 60 extends from the side walls 14 and 18 so as to bear against the portion 61 of the duct 24 that extends into the interior of the box 14.

In this configuration, the expandable polymeric material 60 can serve as insulation. This insulation is compliant with national building codes, is fire resistant, and also avoids the use of fibrous insulation material. As such, this type of material, since it avoids the fibrous material in the assembly requirements, improves the health and safety of workers that assemble the register box 10. The insulation created by the expandable polymeric material 60 does not require any alterations in the structure of the box 12 or of the duct 24. The insulation material causes the register box 10 to be very energy-efficient.

In FIG. 4, it can be seen that there is no expandable polymeric material located on the inner wall 68 of the duct 24. If any expandable polymeric material would enter the duct 24 or reside on the inner wall 68 of the duct 24, and it could hamper air circulation. Any expandable polymeric material that enters the duct 24 certainly detracts from the appearance of the insulated register box 10. Furthermore, any expandable polymeric material that should leak into the interior of the duct 24 will create uncertainties as to the amount of the amount of material that should be introduced into the interior of the register box. If an excessive amount of expandable polymeric foam material leaks into the interior of the duct, then less material will reside on the interior of the insulated register box. This can hamper the insulating qualities of the register box. Additionally, if any expandable polymeric material should leak into the interior of the duct, it will be necessary to add personnel in order to clean and scrape this material from the interior of the duct. This increases time and labor required for the production of the insulated register box. It is possible that, during the removal of such material located within the interior of the duct, the insulation on the interior of the register box could tear. Ideally, the prevention of expandable polymeric foam material from entering the interior of the duct can result in uniform amounts of expandable polymeric material being introduced. As such, it was felt that it was important to block any movement of the expandable polymeric material from entering the area of the interior of the duct 24. Since the expandable polymeric material 60 extends to the aperture that is defined by the lips 50 and the flanges 48, it does not interfere with air flow into the interior of the register box. The movement of the expandable polymeric material toward the interior of the duct 24 is blocked by the portion 61 of the duct 24. The blocking of the expansion of the expandable polymeric material into the interior of the duct will be further blocked by the plug as used in the process of the present invention, to be described hereinafter. As such, the blocking of this expandable polymeric foam material from entering the interior of duct allows the interior of the duct to be substantially aerodynamic, reduces labor and material cost, improves uniformity, improves the aesthetic appearance of the register box, and reduces costs.

Figure 5:
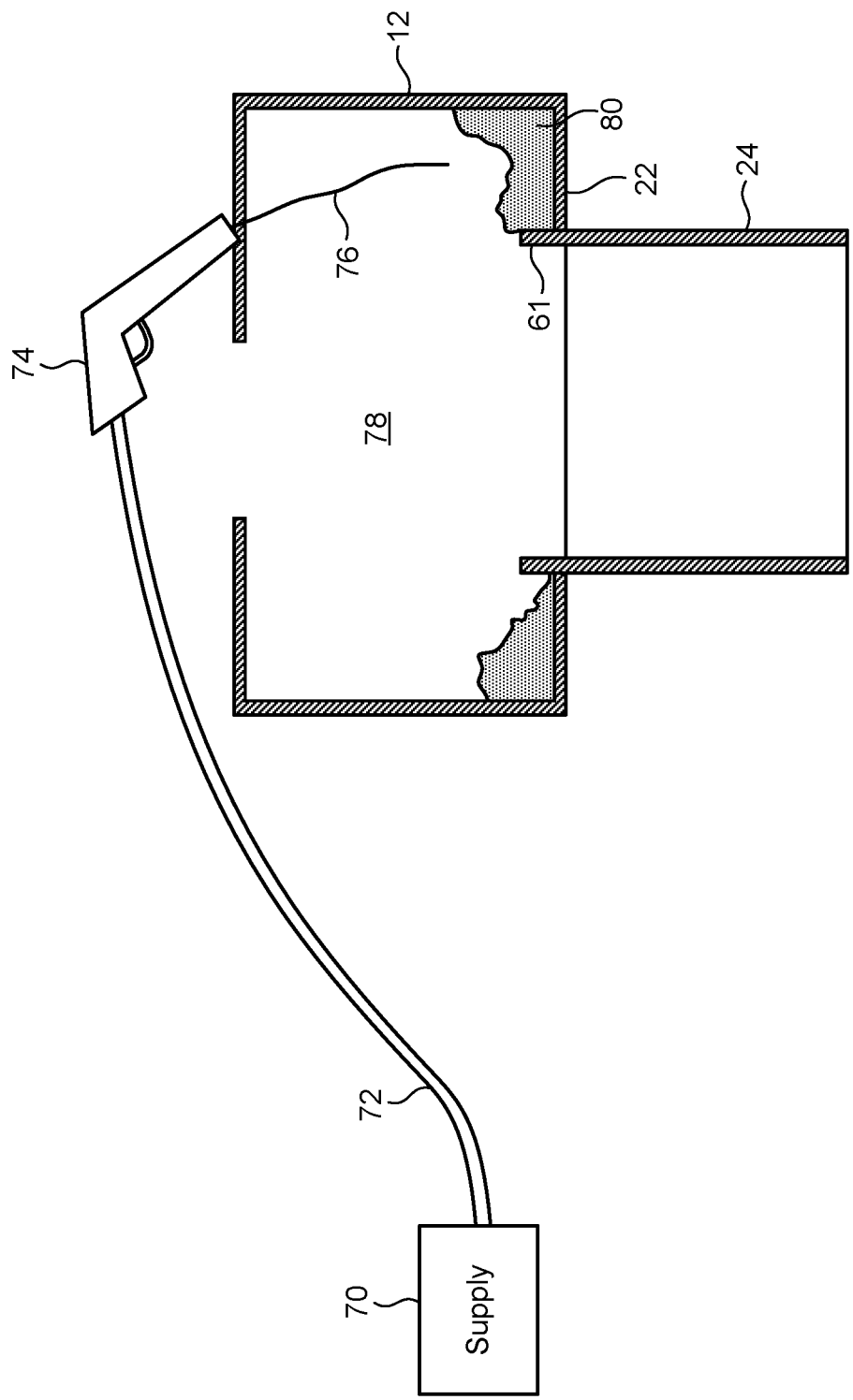
FIG. 5 shows an initial step in the process for forming an insulated register box.

FIG. 5 shows an initial step in the process of the present invention. In FIG. 5, it can be seen that there is a supply of expandable polymeric material 70 that is connected by a conduit 72 to a foam gun 74. A pump can be used in association with the conduit 72 and/or the supply 70 in order to allow the gun 74 to spray the expandable polymeric material 76 into the box 12 of the register box. In particular, it can be seen that the expandable polymeric material 76 is generally introduced into a corner 80 between one of the side walls 14, 16, 18 and 20 and the back wall 22. The portion 61 of the duct 24 extends into the interior 78 of the box 12 so as to resist the flow of expandable polymeric material into the interior of the duct 24. The small amount of expandable polymeric material that is placed into the interior 78 of the box 12 will suitably expand so as to cover the necessary area in order to create the insulation shown in FIG. 4.

Figure 6:
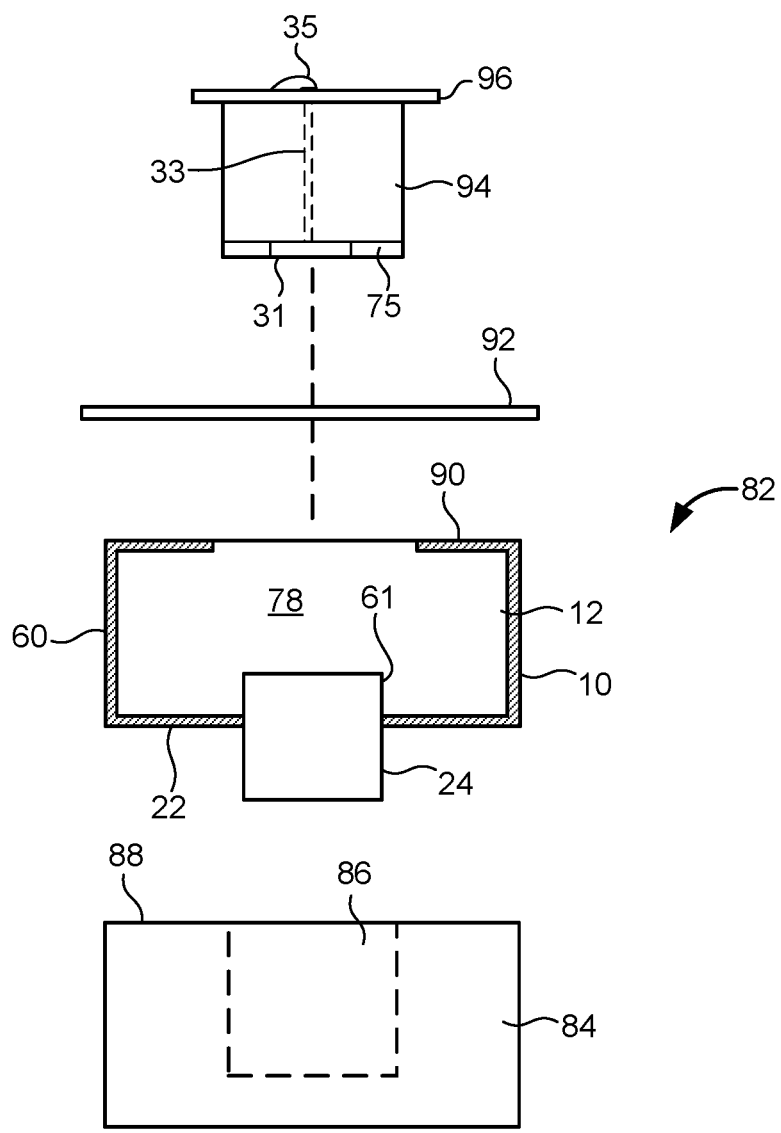
FIG. 6 is an exploded view showing the assembly of components used in the process for forming an insulated register box.

FIG. 6 shows an exploded view showing an assembly 82 of the various components to be introduced into the conveyor system of the present invention. The assembly 82 includes the register box 10 having the duct 24 extending outwardly of the box 12. The duct 24 has portion 61 extending into the interior of the box 12. A support 84 is shown below the register box 10. The support 84 can be a metallic or wooden block that has an opening 86 formed therein. Opening 86 is sized and shaped so as to receive the duct 24 therein. The back wall 22 of the register box 10 will rest on the top side 88 of the block 84. As such, this provides a strong and steady support for the register box 10 during the processes of the present invention.

FIG. 6 shows that the interior 78 of the register box faces upwardly toward an end 90 opposite to the back wall 22. In order to form the insulation 60, initially, a plastic sheet 92 will be placed over the upper end 90 of the box 12. The plug 94 of the present invention will then be inserted into the interior 78 of the box 12. After the plug 94 is inserted into the box 12, the plastic sheet 92 will envelop the exterior surface of the plug 94 so as to be interposed between the expandable polymeric material 60 and the exterior surface of the plug 94. In essence, this plastic sheet 92 provides a lining or a barrier so as to allow the plug 94 and plastic sheet 92 to be easily removed after the expandable polymeric material 60 has expanded and cured.

FIG. 6 further shows that the plug 94 has a ledge 96 that extends outwardly from the remainder of the body. This ledge 96 will be placed over the end of the box 12 and over that portion of the plastic sheet 92 that extends outwardly over this end 90 of the box 12 so as retain the plastic sheet 92 in position. Ultimately, this will create a sandwiched configuration which will allow the plug and assembly of the present invention to form the insulated register box. A gasket 75 is affixed to the bottom wall of the plug 94. Gasket 75 can be formed of an elastomeric or polymeric material. Ultimately, the plastic sheet 92 will be interposed between the bottom of the gasket 75 and the end of the portion 61 of duct 24. The resiliency of the gasket 74 will tend to "mold" the gasket 75 around the end of the portion 61 of duct 24 so as to prevent the expandable polymeric material 60 from entering into the interior of the duct 24. A rotatable element 31 is illustrated as positioned within the gasket 75. A shaft 33 is connected to the rotatable element 31. Handle 35 is connected to the shaft 33 so as to allow a user to manually rotate the rotatable element 31 between an installation position and a sealing position. The rotatable element 31 has a bottom that is coplanar with the bottom of the gasket 75. As will be described hereinafter, the plug 94 will be installed into the opening at the upper end 90 of box 12 so that the plastic sheet 92 envelops the exterior of the plug 94. The rotatable element 31 is rotated by the handle 35 so as to move to the installation position. The plug 94 is then placed on to the end 61 of the duct 24. Since the plug 94 has at least one dimension that is less than the diameter of the duct 24, the rotatable element 31 facilitates the ability to install the gasket 75 and the rotatable element 31 entirely around end 61 of the duct 24.

Figure 7:
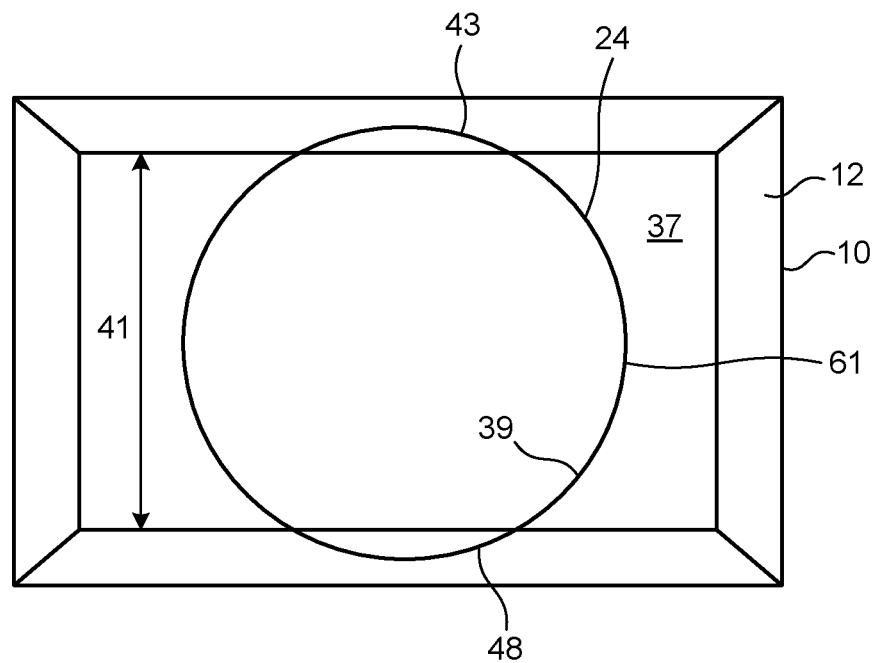
FIG. 7 is an end view showing the relationship of the opening of the duct to the opening of the box of the register box.

FIG. 7 shows an end view of the insulated register box 10. In particular, this end view shows box 12 as having an opening 37 at an end thereof. The duct 24 is illustrated as opening to the interior of the box 12. Importantly, in FIG. 7, it can be seen that the duct 24 has an inner diameter 39 that is greater than the width 41 of the box 12. As such, if a conventional plug were inserted through the opening 37 of the box 12, it would not adequately cover the entire end 61 of the duct 24. Portions 43 would lie outside the surface of the plug. As such, the present invention was developed in an effort to effectively seal those portions 43 that would be outside the reach of a conventional plug.

Figure 8:
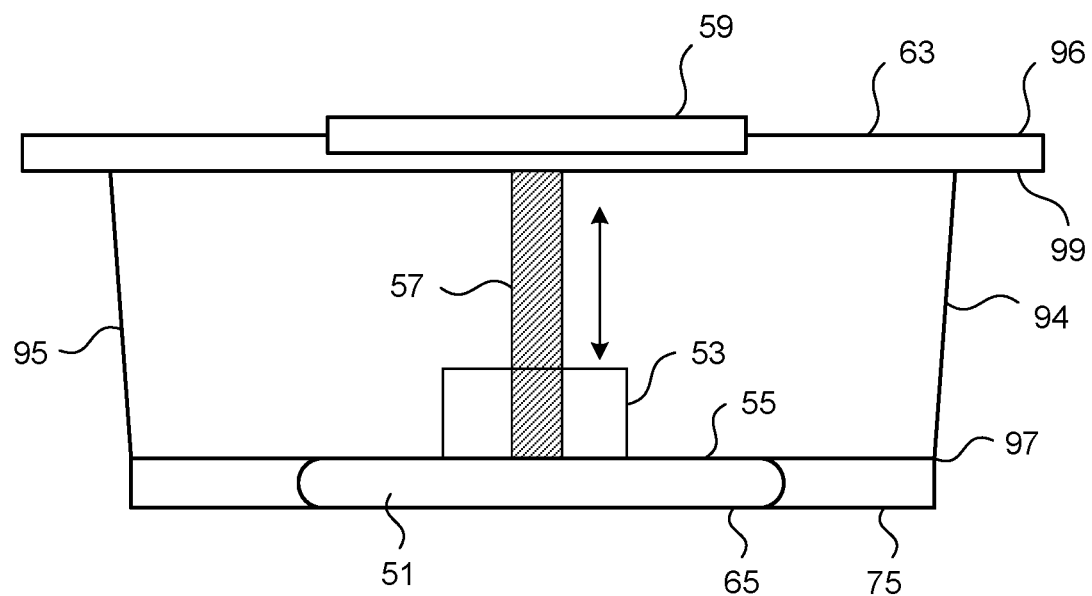
FIG. 8 is a cross-sectional side view showing the rotatable element and activation plate in accordance with the teachings of the present invention.

FIG. 8 shows the plug 94 of the present invention. Plug 94 has a generally tapered outer surface 95. This tapered outer surface 95 will taper so as to narrow in diameter toward the bottom wall 97. A ledge 96 is at the wide end of the tapered exterior surface 95 of the plug 94. The underside 99 of the ledge 96 will bear against the plastic sheet 92 during the formation of the insulated register box 10 of the present invention. It can be seen that the gasket seal 75 is affixed to the bottom 97 of the plug 94. The gasket seal 75 extends across the bottom 97 of the plug 94. As such, this provides a surface that can bear against the end of the duct within the interior of the register box 10. The tapered exterior surface 95 of the plug 94 facilitates the ability to remove the plug 94 once the expandable polymeric material 60 envelops the plastic sheet and tapered exterior surface 95. The tapered exterior surface 95 of the plug 94 should have a size suitable for fitting within the opening 37 of the box 12. As such, the ledge 97 will overlie the flange located at the end of the register box.

In FIG. 8, it can be seen that there is a rotatable element 51 positioned at the bottom 97 of the plug 94. A block 53 is secured to the back 55 of the rotatable element 51. A shaft or screw member 57 is affixed to the block 53 and extends upwardly in the interior of the plug 94. Shaft 57 will connect to an activation plate 59 located at the top 63 of the plug 94. Activation plate 59 can include a suitable inset handle therein so that the rotation element 51 can be suitably rotated between the installation position and the sealing position. Alternatively, the activation plate 59 can be a depressable plate which causes the screw 57 to rotate 90° so as to correspondingly rotate the rotatable element 51. This mechanism is utilized in many well-known ratchet-type screwdrivers and similar devices. In other words, upon compression of the activation plate 59, the screw 57 will rotate 90° so as to cause a corresponding 90° rotation of the rotatable element 51. Upon the release of compression, the screw 57 will rotate a further 90° or return to the original 90° so that the rotatable element 51 is aligned with the gasket 75. Importantly, as will be described hereinafter, the use of this activation plate in the conveyor process of the present invention will cause the desired movement of the rotatable element 51 automatically as it passes through the conveyor system.

FIG. 8 shows that the rotatable element 51 has a bottom surface 65 that is coplanar with the bottom surface of the gasket 75. This rotatable element can be formed of a polymeric or elastomeric material or can be a plate having polymeric or elastomeric material thereon.

Figure 9A:
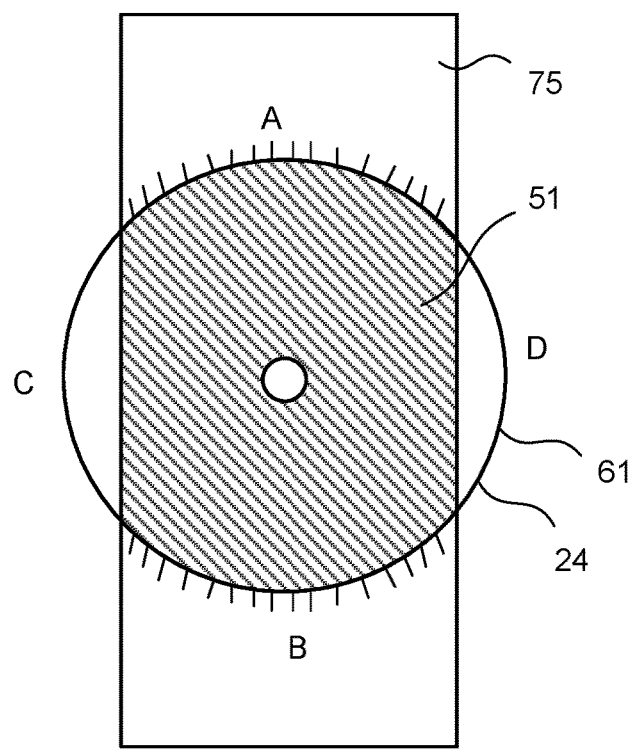
FIGS. 9A and 9B show a bottom view of the present invention in relation to the sealing of they duct.

FIG. 9A illustrates the movement of the rotatable element 51. Rotatable element 51 is shown in relation to the end 61 of the duct 24. FIG. 9A shows the rotatable element 51 in its installation position. In this installation position, the rotatable element 51 is aligned with the gasket 75. As such, areas of the duct 24 represented by letters "C" and "D" would normally be exposed. The rotatable element 51 has a pair of sides in parallel relation and curved ends extending across opposite end of the parallel sides.

Figure 9B:
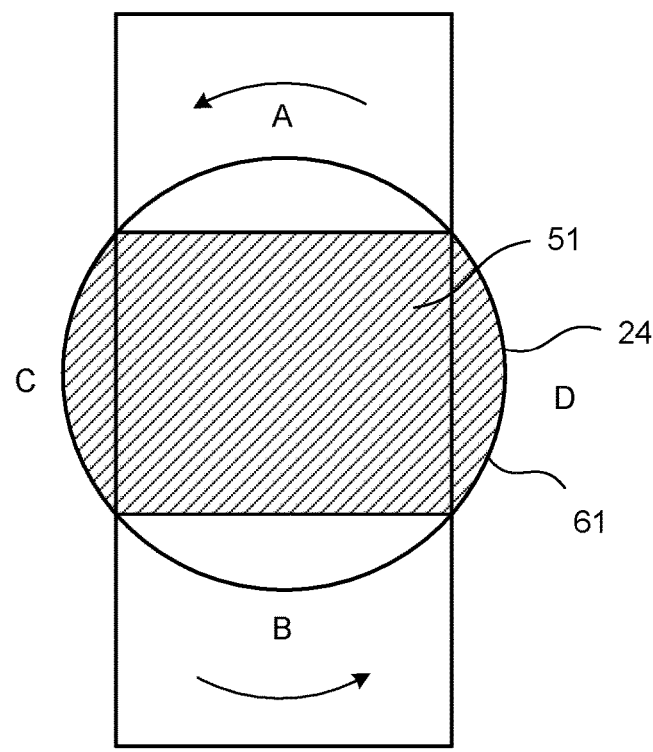

FIG. 9B shows the rotation of the rotatable element 51 to its sealing position. In this manner, the rotatable element 51 is rotated 90°. In this position, the previously exposed areas at the end 61 of duct 24 are now covered by the rotatable element 51. The previous portions indicated with the reference letters "A" and "B" are now exposed but would be covered by the gasket 75. In particular, the exposed portions of duct 24 are now covered by the flaps at the curved ends of the rotation element 51. As such, the entire end 61 of the duct 24 will be covered by the rotatable element 51.

Figure 10:
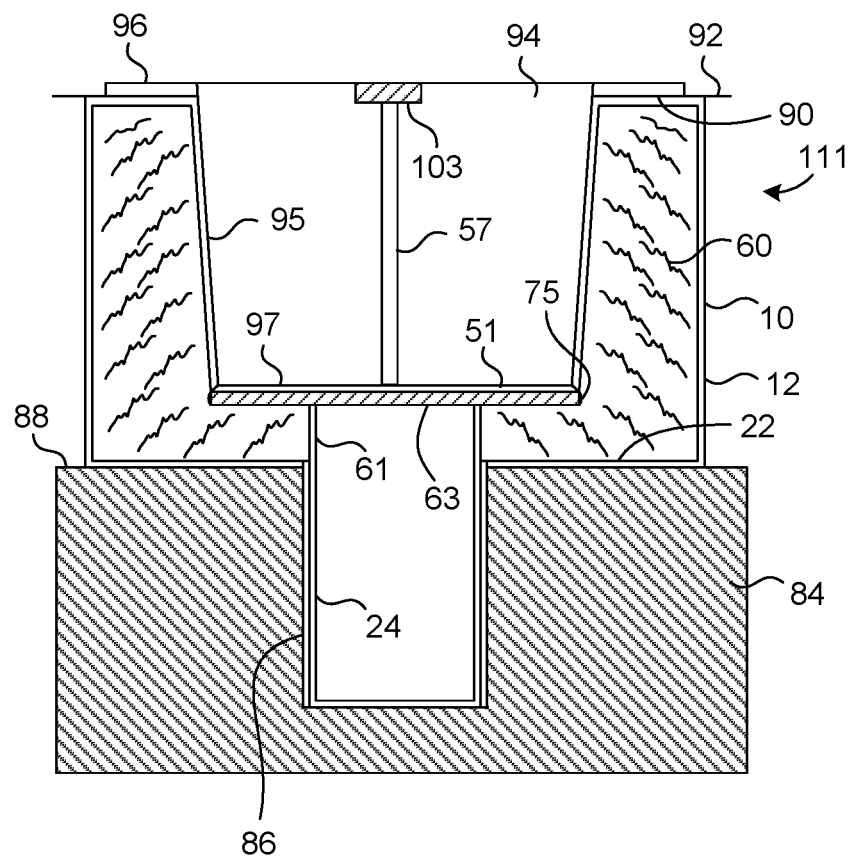
FIG. 10 is a cross-sectional view showing the assembly of components of the present invention as used in the process for forming the insulated register box of the present invention.

FIG. 10 shows the assembly 111 of the present invention. The assembly 111 is adapted to allow the insulated register box 10 to be formed. The insulated register box 10 includes the box 12 and the duct 24. Duct 24 has a portion 61 that extends into the interior of the box 12. Ultimately, the duct 24 will terminate at end 63. The box 12 includes a back wall 22, side walls extending upwardly from the back wall 22, and a top surface 90. The expandable polymeric foam material 60 is illustrated as positioned within the interior of the box 12 of the insulated register box 10.

The assembly 111 of the present invention includes a support 94 having an opening 86 extending into the interior of the support 84 from the top 88 thereof. Opening 86 receives the duct 24 therein. The back wall 22 of the box 12 will rest on the top 88 of the support 84. The plug 94 is introduced into the interior of the box 12 prior to the expansion of the expandable polymeric material 60. Plug 84 has gasket 75 located at the bottom thereof. Additionally, rotatable element 51 is also positioned at the bottom 97. Plug 94 has tapered outer surface 95 extending upwardly from the bottom wall 97. The ledge 96 will extend radially outwardly at the top of the plug 94 so as to overlie the top 90 of the box 12 of the insulated register box 10. It can be seen in FIG. 10 that a handle 103 is positioned adjacent to the top of the plug 94. Handle 103 engages with shaft 57 so as to manually move the rotatable element 51 from its installation position to its sealing position. The plastic sheet 92 envelops the plug 94. In particular, the plastic sheet 92 will extend between the gasket 75 and the end 63 of duct 24. The plastic sheet 92 will also extend between the tapered outer surface 95 of the plug 94 and the expandable polymeric material 60. The plastic sheet 92 will also underlie the ledge 96 and extend outwardly at the top of the plug 94. As such, upon removal, the plastic sheet 92 will allow the plug 94 to easily separate from the expandable polymeric material.

In FIG. 10, it is important to see that the gasket 95 establishes a tight seal between the plug 94 and the end 63 of the duct 24. This is very important so as to prevent the expandable polymeric material 60 from entering the interior of the duct 24. This tight seal around the circumference of the end 63 of the duct 24 avoids any leakage of material into the interior of the duct 24. Since the intrusion of expandable polymeric material 60 into the interior of duct 24 is prevented by the rotatable element 51 and by the gasket 75 of the present invention, there is no subsequent need for cleaning actions for the removal of the foam from the interior of the duct 24. Also, this assures that the uniform introduction of expandable polymeric material into the interior of the box 12 will create uniform results. The appearance of the insulated register box 10 is improved by avoiding the appearance of scraped or residual material in the interior of the duct 24. This also avoids those problems in which the expandable polymeric material 60 is damaged during the cleaning of the interior of the duct 24. As such, plug 94, along with the assembly 111, of the present invention provides cost savings, reduction in lost materials, reduce labor costs and improved aesthetics.

Figure 11:
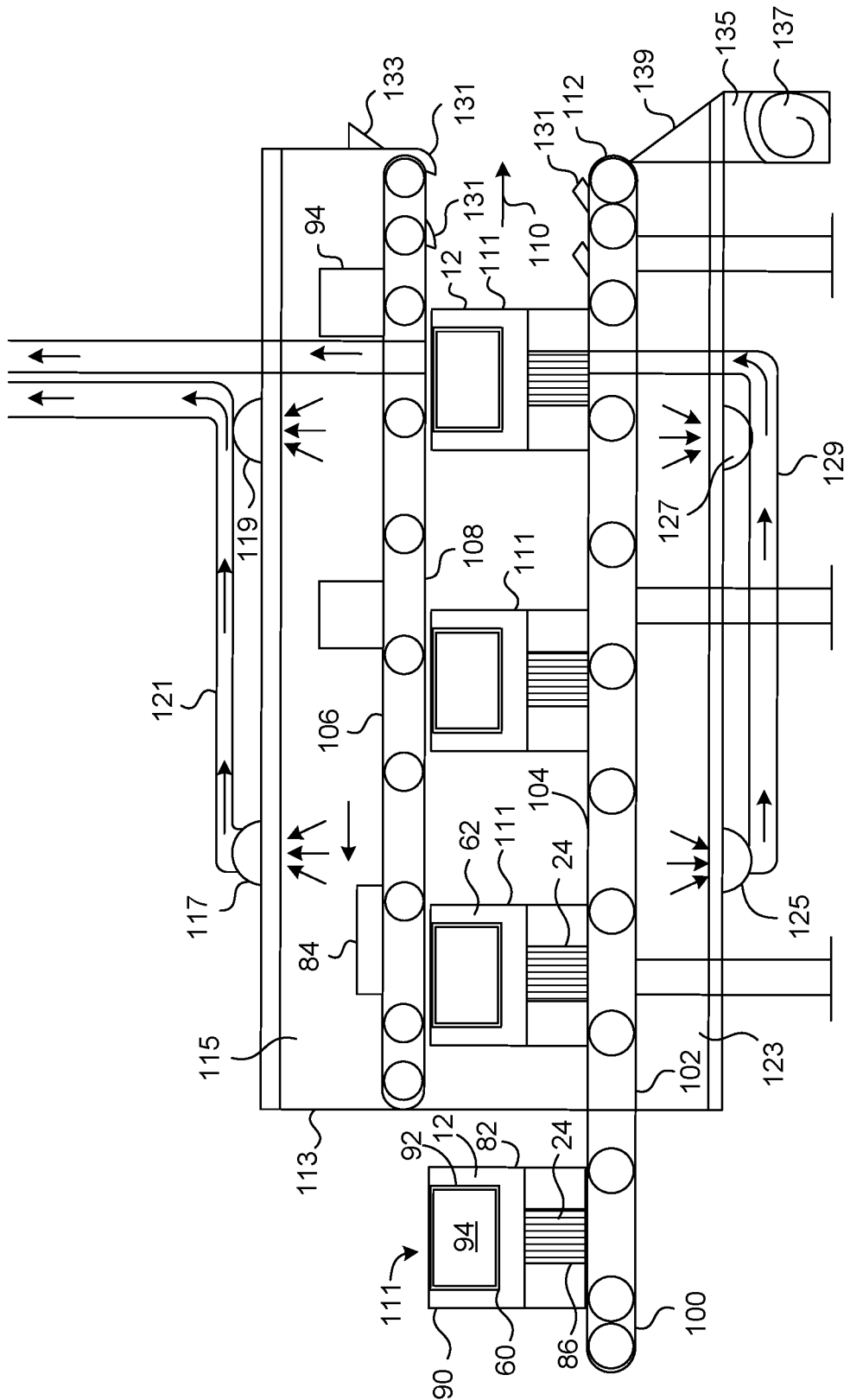
FIG. 11 is a side elevational view showing the process for forming the insulated register box of the present invention.

FIG. 11 shows the assembly 111 residing at an end 100 of a lower conveyor 102. As can be seen, the duct 24 is received in the opening 86 of the support 84. The plug 94 has been received in the interior 78 of the box 12. The plastic sheet 92 surrounds the exterior of the plug 94 and is interposed between the expandable polymeric material 60 and the exterior of the plug 94. The conveyor 102, as shown in FIG. 11, will cause the relatively rigid belt 104 thereon to move in a generally clockwise manner. As such, the assembly 111 will move from the position at the end 100 of the conveyor 102 to a position located between conveyor 102 and conveyor 106. Conveyor 102 has a length slightly longer than the length of the conveyor 106 so as to allow the placement of the plug 96 onto the assembly 92. Ultimately, the assembly 111 will enter the area between the conveyors 102 and 106. The rigid nature of the belt 104 of conveyor 102 and belt 108 of conveyor 106 will cause the plug 94 to compress against the end of portion 61 of the duct 24 and against the end 90 of the box 12. This compression will allow the expandable polymeric material 62 expand and cure. The tight relationship between the plug 94 and the end of the portion 61 of the duct 24 will prevent the expandable polymeric material 60 from entering the interior of the duct 24. This avoids those circumstances where the worker places the plug 94 too loosely onto the assembly such that expandable polymeric material leaks into the interior of the duct. Similarly, the tight relationship between the belt 108 and the plug 94 will cause plug 94 to always bear with constant force against the end 90 of the box 12 so as to prevent the expandable polymeric material 60 from escaping into the interior 78 of the box 12. The compression of the conveyors 102 and 106 upon the activation plate 59 of the plug of the present invention will cause the rotatable element to automatically rotate 90° so as to effectively cover the entire circumference of the end of the portion 61 of the duct 24. As such, this further improves the sealing relationship between the plug and the end of the duct.

As can be seen in FIG. 11, the assembly 111 will continue to move along the conveyors 102 and 106 in a tightly compressed configuration. The length of the conveyors 102 and 106 is configured so as to allow for a proper amount of curing time. In actuality, workers will continue to place separate assemblies 111 one after the other upon the conveyor 102 so that the process is a continuous process. The assemblies 111 will be spaced from one another throughout their travel with the conveyors 102 and 106. The arrow 110 illustrates the direction of movement of the assemblies 82 on the parallel conveyors. When the assembly 111 reaches the end of the compressive relationship with the conveyors 102 and 106, pressure will be removed from the activation plate so that the rotatable element rotates another 90°, one way or the other, so as to return back to the installation position. This allows the plug to be easily removed from the assembly.

It is important to note that the belt 108 of conveyor 106 moves in a counter-clockwise direction. As such, when the assembly 111 reaches the end of travel between the conveyors 102 and 106, the assembly can be removed. As such, materials can be returned back to the end 100 for use by the worker. As can be seen in FIG. 11, when the assembly 111 reaches the end of travel, the plug 94 is removed from the interior of the box 12. This can be placed on the top of the belt 108 and returned back to the beginning of the conveyor. Similarly, the support 84 can also be placed on the belt 108 and returned back to the original position. As such, as the insulated register box is delivered to the opposite end 112 of the conveyors 102 and 106, the return action of the conveyor 106 will allow each of these components to be returned back to their original position without the need for stacking and transport. As a result, the insulated register box can be created in a simple and efficient manner. This minimizes the number of workers required for the production of such register boxes and also simplifies the labor requirements for such assembly.

In the process of the present invention, fumes are produced during the formation of the register boxes. As such, a housing 113 is positioned over the conveyors 102 and 106. There is an upper portion 115 of the housing 113 that has openings 117 and 119 opening to the interior of portion 115. A pipe 121 is connected to the openings 117 and 119. Ultimately, a vacuum is applied to the interior of the pipe 121 so as to create a section on the interior of the portion 115 of housing 113. As such, gases will escape from the interior of portion 115 by virtue of this vacuum suction. Similarly, another portion 123 of the housing 113 underlies the conveyor 104. Openings 125 and 127 serve to open to the interior of portion 123. Openings 125 and 127 are connected to the pipe 129. Once again, a suction is applied to the pipe 129 so as to draw any vapors from the interior of the portion 123 of housing 113. The suction facilitates drying and curing of the expandable polymeric material. This action is shown by the arrows in FIG. 11.

On occasion, foam and debris 131 may form on the lower surface of the conveyor 106. To remove this foam and debris 131, a scraper 133 is affixed to the housing 113 at the end of the conveyor 106. Scraper 133 will separate the foam and debris 131 such that the foam and debris can fall downwardly and be received within a receptacle 135 therebelow. Receptacle 135 can contain an auger conveyor 137 so as to transport the separated foam and debris to a remote location. Similarly, conveyor 104 also can have debris 131 on the upper surface thereof. Another scraper 139 is affixed to the housing 113 adjacent to the end of the conveyor 104. Scraper 139 will once again separate the foam and debris 131 from the conveyor 104 such that the foam and debris 131 falls downwardly into the receptacle 139. This foam and debris is then transported to into the receptacle 135 and then transported by the auger conveyor 137 to a remote location.

Figure 12:
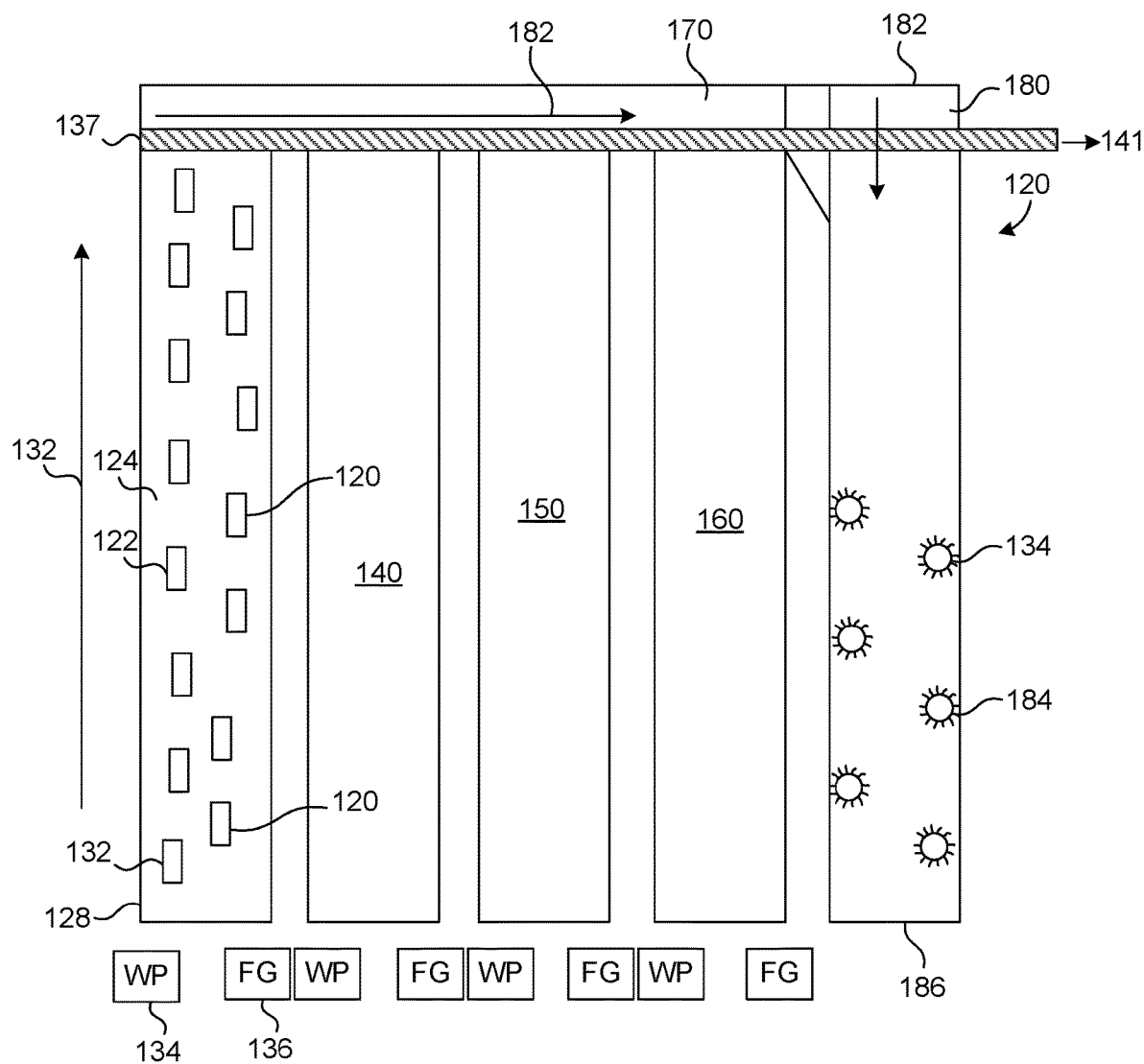
FIG. 12 is a plan view showing the overall process for forming an insulated register box.

FIG. 12 shows a plan view of a layout 124 for the assembly of register boxes. As can be seen in FIG. 12, the various register boxes 122 are arranged in spaced relationship upon the conveyor 124. In actual operation, the register boxes 122 will be placed in staggered relation to register boxes 126. As such, there are two rows in staggered relation that move from end 128 to end 130 of the conveyor 124. Each of the register boxes 122 and 126 is configured in the manner shown by the assembly 111 of FIG. 10. The staggering of the register boxes allows for ease of travel from end 128 to end 130 and such that the conveyor belts will can distribute an even and constant amount of pressure across the surfaces of the assemblies. Arrow 132 illustrates the direction of travel of these register boxes.

In FIG. 12, it can be seen that there is a work pallet 134 and a foam gun 136 positioned adjacent to the end 108 of the conveyor 124. As such, a worker can stand adjacent to the end 128 of the conveyor 124 and have an arrangement of the formed register boxes at one side on the work pallet 134 and the foam gun at the other side. Typically, the work pallet 134 will have a stack of the fabricated register boxes. The foam gun 136 allows the worker to begin the initial step of introducing the expandable polymeric material into the interior of the register box. As such, a single worker will have all of the tools necessary at his or her location adjacent to the end 128 of conveyor 124 so as to carry out the formation of the insulated register box of the present invention.

FIG. 12 shows that the ability to produce register boxes is enhanced by the ability to have additional conveyors 140, 150 and 160 in side-by-side relationship. As such, each of these conveyors 124, 140, 150 and 160 can be used for additional production of insulated register boxes. Under those circumstances where demand is great and greater production is required, all of the conveyors 124, 140, 150 and 160 can be used. Under reduced demand and lower production requirements, only one or a few of such conveyors need to be used. Each of the conveyors 124, 140, 150 and 160 will have an identical construction. As such, the workers will be adjacent to each other at the ends of the respective conveyors.

Each of the conveyors 124, 140, 150 and 160 will have their ends delivering product to transverse conveyor 170. The transverse conveyor will deliver product from the end 130 of conveyor 124 toward the cleaning conveyor 180. Arrow 182 illustrates the direction of movement of the various insulated register boxes exiting the particular conveyors. FIG. 12 also shows the auger conveyor 137. Auger conveyor 137 serves to receive the foam and debris 131 from each of the conveyors 104 and 106. The auger conveyor 137 will also receive the foam and debris from the conveyors 140, 150 and 160. The auger conveyor 137 will then transport the foam and debris to a remote location 141. A suitable siphon collector can be located at the remote location so as to suction the foam and debris from the surfaces of the auger conveyor 137. As such, the conveyors will remain clean throughout their continuous use.

A worker will reside at end 182 of the conveyor 180. As such, the arrangement and order of insulated register boxes being delivered to the transverse conveyor 170 is not important. Ultimately, these insulated register boxes will funnel in the direction toward the surface of the conveyor 180. The worker at the end 182 will invert each of the register boxes so that the duct resides at the top of the insulated register box. It can then move along the cleaning conveyor 180 to brushes 184. Brushes 184 are configured so as to clean the exterior surface of the duct. It was found that many customers preferred ducts that do not have expandable polymeric material on the exterior thereof. The appearance of such expandable polymeric material on the exterior of the duct can inhibit the ability to join the duct to the HVAC system. As such, this cleaning step is necessary so as to assure that the exterior surface of the duct is particularly clean. Ultimately, the cleaned insulated register boxes will exit the process of the present invention at the end 186 of the cleaning conveyor 180.

Figure 13:
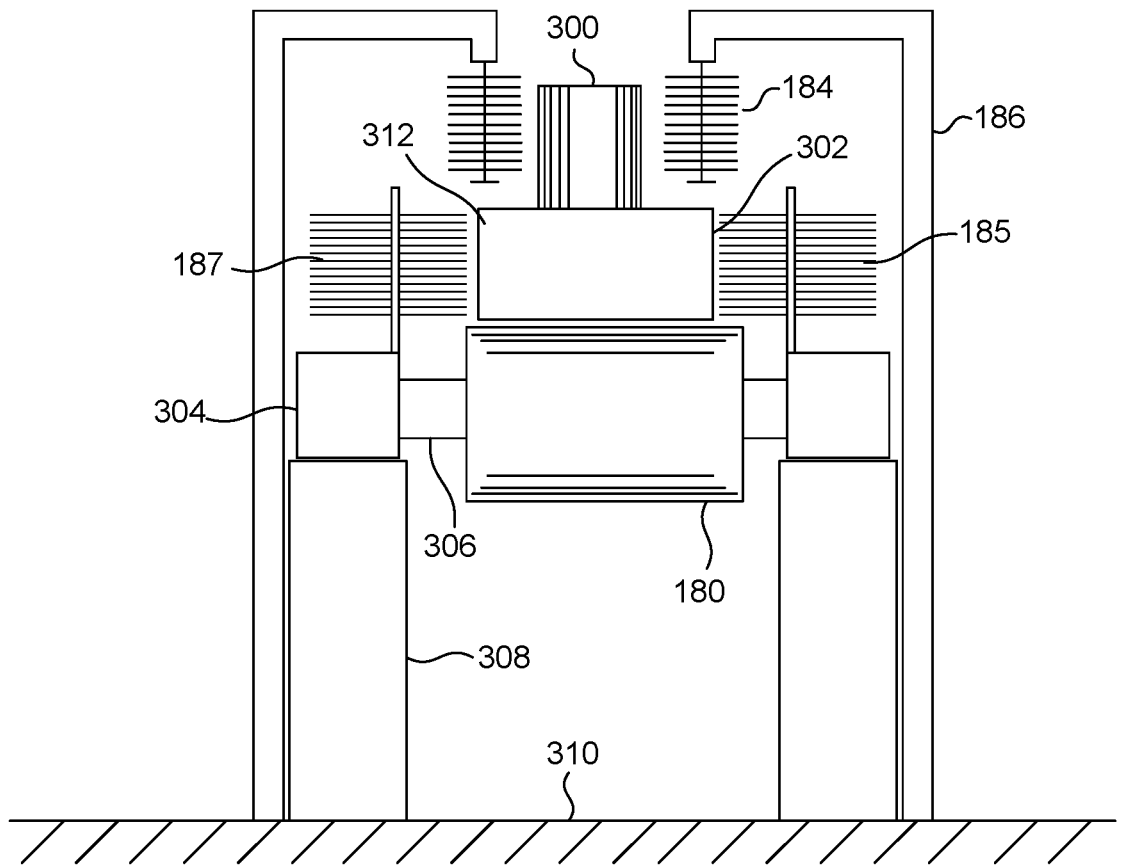
FIG. 13 is an end view showing the cleaning step in the process for forming an insulated register box.

FIG. 13 illustrates the configuration of the brushes used for the cleaning of the duct 300 of register box 302. In particular, it can be seen that the cleaning brushes 184 are supported by frame 186 above the cleaning conveyor 180. The cleaning brushes 184 can be suitably motorized so as to rotate for the proper cleaning of the duct 300. Alternatively, the motion of the insulated register box 302 on the cleaning conveyor 180 can create enough motion out of stationary cleaning brushes 184 to effectively remove the expandable polymeric material from the exterior of the duct 300. It can also be seen that there are also cleaning brushes 185 and 187 located on opposite sides of the body of the insulated register box 302. As such, while the cleaning brushes 184 serve to clean the exterior surfaces of the duct 300, cleaning brushes 185 and 187 serve to clean the exterior surfaces of the body of the insulated register box 302. As such, the process provides a clean and debris-free register box.

FIG. 13 also shows that there is a motor 304 associated with a shaft 306 that can drive the movement of the cleaning conveyor 180. The shaft 306 and the motor 304 supported by structure 308 above an underlying surface 310. Similar mechanisms can be used in association with the various conveyors described herein previously. The support of the cleaning brushes 184 to the side of and above the cleaning conveyor 180 avoids any interference with the proper motion of the cleaning conveyor 180 and avoids any interference with the movement of the body 312 of the insulated register box 302.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A plug assembly for use in a process for manufacturing an insulated register box, the insulated register box having a box with a duct affixed thereto and extending thereinto, the plug assembly comprising:
   a body having a bottom and at least one side wall extending upwardly from the bottom;
   a rotatable element at the bottom of said body, said rotatable element adapted to seal an end of the duct in an interior of the box, said rotatable element being movable between an installation position and a sealing position, said rotatable element having sides extending in parallel relation to each other and curved ends at opposite ends of the sides, the curved ends defining flaps at the opposite ends of the sides; and
   an actuator connected to said rotatable element and positioned above said rotatable element, said actuator cooperative with said rotatable element so as to move said rotatable element between the installation position and the sealing position.

2. The plug assembly of claim 1, said rotatable element being formed of a polymeric material or an elastomeric material or having a polymeric material or an elastomeric material thereon.

3. The plug assembly of claim 1, further comprising:
   a gasket seal affixed to the bottom of said body, said rotatable element positioned centrally of said gasket seal.

4. The plug assembly of claim 3, said rotatable element having a bottom surface adapted to abut the end of the duct, the bottom surface of said rotatable element being coplanar with the bottom of said gasket seal.

5. The plug assembly of claim 1, the sealing position of said rotatable element being transverse to the installation position of said rotatable element.

6. The plug assembly of claim 1, said actuator connected to said rotatable element by a shaft.

7. The plug assembly of claim 6, said actuator being a handle positioned at the top of said body, said shaft extending downwardly from the handle so as to connect to the rotatable element.

8. The plug assembly of claim 6, said rotatable element having a block affixed thereto, said shaft being affixed to said block.

9. The plug assembly of claim 1, the body comprising a plurality of side walls, said body having a plurality of ledges extending outwardly of an upper end of the plurality of side walls, the plurality of ledges adapted to abut an upper end of the box opposite the duct.

10. The plug assembly of claim 1, the body comprising a plurality of side walls, the plurality of side walls being tapered so as to narrow toward the bottom of said body.

11. A plug assembly for use in a process for manufacturing an insulated register box, the insulated register box having a box with a duct affixed thereto and extending thereinto, the plug assembly comprising:
   a body having a bottom and at least one side wall extending upwardly from the bottom;
   a rotatable element at the bottom of said body, said rotatable element adapted to seal an end of the duct in an interior of the box, said rotatable element being movable between an installation position and a sealing position, said rotatable element having sides extending in parallel relation to each other and curved ends at opposite ends of the sides, the curved ends defining flaps at the opposite ends of the sides; and
   an actuator connected to said rotatable element and positioned above said rotatable element, said actuator cooperative with said rotatable element so as to move said rotatable element between the installation position and the sealing position, said actuator having an activation plate positioned at a top of said body, the activation plate adapted to rotate said rotatable element by 90° upon receiving a compressive force thereon, the activation plate returning said rotatable element 90° degrees or moving said rotatable element another 90° upon release of the compressive force.

12. An assembly for use in a process for manufacturing an insulated register box, the assembly comprising:
   a register box having a box and a duct affixed to the box, the duct having an end extending into an interior of the box, the box having an opening at an end opposite the duct, the opening of the box having a width or length less than a diameter of the duct;
   a support having an opening at an upper surface thereof, the duct of said register box received in the opening of said support;
   an expandable polymeric material received in the interior of the box;
   a plug assembly comprising:
      a body having a bottom with at least one side wall extending upwardly from the bottom;
      a rotatable element at the bottom of the body, said rotatable element adapted to seal an end of the duct in the interior of the box, said rotatable element being movable between an installation position and a sealing position;
      an actuator connected to said rotatable element and positioned above said rotatable element, said actuator cooperative with said rotatable element so as to move said rotatable element between the installation position and the sealing position; and
   a plastic sheet interposed between the plug assembly and the expandable polymeric material.

13. The assembly of claim 12, said rotatable element being formed of a polymeric material or elastomeric material or having a polymeric material or an elastomeric material thereon.

14. The assembly of claim 12, said rotatable element having sides extending in parallel relation and curved ends at opposite ends of the sides.

15. The assembly of claim 12, further comprising:
   a gasket seal affixed to the bottom of said body, said rotatable element positioned centrally of said gasket seal.

16. The assembly of claim 15, said rotatable element having a bottom surface abutting the end of the duct, the bottom surface of said rotatable element being coplanar with a bottom of said gasket seal.

17. The assembly of claim 12, the sealing position of said rotatable element being transverse to the installation position of said rotatable element.

18. The assembly of claim 12, said actuator connected to said rotatable element by a shaft, the actuator being a handle positioned at the top of the body, the shaft extending downwardly from the handle so as to connect to said rotatable element, said rotatable element having a block affixed thereto, said shaft affixed to said block.

19. The assembly of claim 12, said actuator being an activation plate positioned at the top of said body, the activation plate adapted to rotate said rotatable element by 90° upon receiving a compressive force thereon, the activation plate returning said rotatable element 90° or moving said rotatable element another 90° upon release of the compressive force.

* * * * *